United States Patent
Pong

(10) Patent No.: US 8,619,790 B2
(45) Date of Patent: *Dec. 31, 2013

(54) ADAPTIVE CACHE FOR CACHING CONTEXT AND FOR ADAPTING TO COLLISIONS IN A SESSION LOOKUP TABLE

(75) Inventor: Fong Pong, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 1587 days.

This patent is subject to a terminal disclaimer.

(21) Appl. No.: 11/228,398

(22) Filed: Sep. 16, 2005

(65) Prior Publication Data

US 2006/0274742 A1 Dec. 7, 2006

Related U.S. Application Data

(60) Provisional application No. 60/688,297, filed on Jun. 7, 2005.

(51) Int. Cl.
 H04L 12/28 (2006.01)
 H04J 3/16 (2006.01)
 G06F 12/08 (2006.01)
 G06F 13/00 (2006.01)

(52) U.S. Cl.
 USPC ........ 370/395.7; 370/392; 370/469; 370/471; 711/3; 711/108

(58) Field of Classification Search
 USPC ......... 370/351, 360, 379, 382–383, 389, 392, 370/395.32, 395.7, 395.72, 465–466, 469, 370/471; 709/212, 217; 710/1, 3, 5, 20, 22, 710/36, 39, 107, 308, 310, 200; 711/1, 3, 711/100, 104, 108–111, 118, 163–164
 See application file for complete search history.

(56) References Cited

U.S. PATENT DOCUMENTS

| | | | |
|---|---|---|---|
| 6,212,602 B1 * | 4/2001 | Wicki et al. | 711/122 |
| 6,829,217 B1 * | 12/2004 | Bechtolsheim et al. | 370/229 |
| 7,032,073 B2 * | 4/2006 | Mizrachi et al. | 711/119 |
| 7,310,667 B2 * | 12/2007 | Banerjee et al. | 709/224 |
| 2003/0065812 A1 * | 4/2003 | Beier et al. | 709/236 |
| 2005/0105531 A1 * | 5/2005 | Zur et al. | 370/395.5 |
| 2005/0165985 A1 * | 7/2005 | Vangal et al. | 710/107 |
| 2005/0226238 A1 * | 10/2005 | Hoskote et al. | 370/389 |

* cited by examiner

*Primary Examiner* — Redentor Pasia
(74) *Attorney, Agent, or Firm* — Thomas | Horstemeyer, LLP.

(57) ABSTRACT

Certain embodiments of the invention may be found in a method and system for an adaptive cache for caching context and for adapting to collisions in session lookup table. A network processor chip may comprise an on-chip cache that stores transport control blocks (TCB) from a TCB array in external memory to reduce latency in active transmission control protocol/Internet protocol (TCP/IP) sessions. The on-chip cache may comprise a tag portion implemented using a content addressable memory (CAM) and a data portion implemented using a random access memory (RAM). When a session collision occurs the context of a subsequent network connection may be stored in a data overflow portion of an overflow table in the on-chip cache. A search key associated with the subsequent network connection that comprises network connection parameters may be stored in a tag overflow portion of the overflow table.

27 Claims, 11 Drawing Sheets

ADAPTIVE CACHE FOR CACHING CONTEXT AND FOR ADAPTING TO COLLISIONS IN A SESSION LOOKUP TABLE

CROSS-REFERENCE TO RELATED APPLICATIONS/INCORPORATION BY REFERENCE

This patent application makes reference to, claims priority to and claims benefit from U.S. Provisional Patent Application Ser. No. 60/688,297 filed on Jun. 7, 2005.

This patent application makes reference to:
U.S. patent application Ser. No. 11/228,363 filed Sep. 16, 2005;
U.S. patent application Ser. No. 11/228,863 filed Sep. 16, 2005;
U.S. patent application Ser. No. 11/228,060 filed Sep. 16, 2005;
U.S. patent application Ser. No. 11/228,163 filed Sep. 16, 2005;
U.S. patent application Ser. No. 11/228,059 filed Sep. 16, 2005; and
U.S. patent application Ser. No. 11/228,362 filed Sep. 16, 2005.

The above referenced applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of data. More specifically, certain embodiments of the invention relate to a method and system for an adaptive cache for caching context and for adapting to collisions in a session lookup table.

BACKGROUND OF THE INVENTION

The International Standards Organization (ISO) has established the Open Systems Interconnection (OSI) Reference Model. The OSI Reference Model provides a network design framework allowing equipment from different vendors to be able to communicate. More specifically, the OSI Reference Model organizes the communication process into seven separate and distinct, interrelated categories in a layered sequence. Layer 1 is the Physical Layer. It deals with the physical means of sending data. Layer 2 is the Data Link Layer. It is associated with procedures and protocols for operating the communications lines, including the detection and correction of message errors. Layer 3 is the Network Layer. It determines how data is transferred between computers. Layer 4 is the Transport Layer. It defines the rules for information exchange and manages end-to-end delivery of information within and between networks, including error recovery and flow control. Layer 5 is the Session Layer. It deals with dialog management and controlling the use of the basic communications facility provided by Layer 4. Layer 6 is the Presentation Layer. It is associated with data formatting, code conversion and compression and decompression. Layer 7 is the Applications Layer. It addresses functions associated with particular applications services, such as file transfer, remote file access and virtual terminals.

Various electronic devices, for example, computers, wireless communication equipment, and personal digital assistants, may access various networks in order to communicate with each other. For example, transmission control protocol/internet protocol (TCP/IP) may be used by these devices to facilitate communication over the Internet. TCP enables two applications to establish a connection and exchange streams of data. TCP guarantees delivery of data and also guarantees that packets will be delivered in order to the layers above TCP. Compared to protocols such as UDP, TCP may be utilized to deliver data packets to a final destination in the same order in which they were sent, and without any packets missing. The TCP also has the capability to distinguish data for different applications, such as, for example, a Web server and an email server, on the same computer.

Accordingly, the TCP protocol is frequently used with Internet communications. The traditional solution for implementing the OSI stack and TCP/IP processing may have been to use faster, more powerful processors. For example, research has shown that the common path for TCP input/output processing costs about 300 instructions. At the maximum rate, about 15 million (M) minimum size packets are received per second for a 10 Gbits connection. As a result, about 4,500 million instructions per second (MIPS) are required for input path processing. When a similar number of MIPS is added for processing an outgoing connection, the total number of instructions per second, which may be close to the limit of a modern processor. For example, an advanced Pentium 4 processor may deliver about 10,000 MIPS of processing power. However, in a design where the processor may handle the entire protocol stack, the processor may become a bottleneck.

Existing designs for host bus adaptors or network interface cards (NIC) have relied heavily on running firmware on embedded processors. These designs share a common characteristic that they all rely on embedded processors and firmware to handle network stack processing at the NIC level. To scale with ever increasing network speed, a natural solution for conventional NICs is to utilize more processors, which increases processing speed and cost of implementation. Furthermore, conventional NICs extensively utilize external memory to store TCP context information as well as control information, which may be used to access local host memory. Such extensive use of external memory resources decreases processing speed further and complicates chip design and implementation.

Existing designs for host bus adaptors or network interface cards (NIC) have relied heavily on running firmware on embedded processors. These designs share a common characteristic that they all rely on embedded processors and firmware to handle network stack processing at the NIC level. To scale with ever increasing network speed, a natural solution for conventional NICs is to utilize more processors, which increases processing speed and cost of implementation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for an adaptive cache for caching context and for adapting to collisions in a session lookup table, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an adaptive cache for caching context and for adapting to collisions in a session lookup table. A network processor chip may comprise an on-chip cache that stores transport control blocks (TCB) from a TCB array in external memory to reduce latency in active transmission control protocol/Internet protocol (TCP/IP) sessions. The on-chip cache may comprise a tag portion implemented using a content addressable memory (CAM) and a data portion implemented using a random access memory (RAM). When a session collision occurs the context of a subsequent network connection may be stored in a data overflow portion of an overflow table in the on-chip cache. A search key associated with the subsequent network connection that comprises network connection parameters may be stored in a tag overflow portion of the overflow table. The search key may comprise network connection parameters such as a local Internet protocol (IP) address (lip), a local port number (lp), a foreign IP address (fip), or a foreign port number (fp). The on-chip cache resource may be dynamically allocated and/or changed to hold active content subsets from a plurality of network connections.

Figure 1:
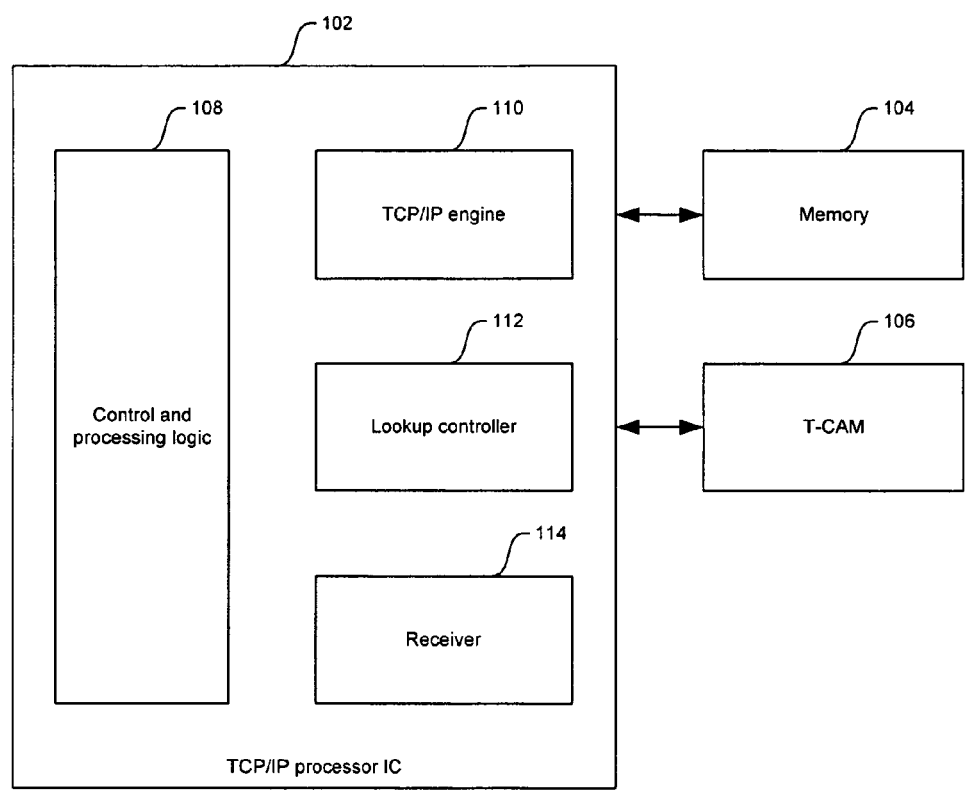
FIG. 1 is a block diagram of an exemplary networking hardware engine for implementing a lookup table utilizing a ternary content addressable memory (T-CAM), which may be utilized in accordance with an embodiment of the invention.

FIG. 1 is a block diagram of an exemplary networking hardware engine for implementing a lookup table utilizing a ternary content addressable memory (T-CAM), which may be utilized in accordance with an embodiment of the invention. Referring to FIG. 1, there is shown a TCP/IP processor integrated circuit (IC) 102, a memory 104, and a ternary-CAM (T-CAM) 106. The TCP/IP processor IC 102 may comprise a control and processing logic 108, a TCP/IP engine 110, a lookup controller 112, and a receiver 114.

The memory 104 may comprise suitable logic, circuitry, and/or code that may be adapted to store information associated with network connections. For example, the memory 104 may be adapted to store information such as the necessary states associated with a network connection. In this regard, the memory 104 may be adapted to store transport control blocks (TCBs) in a TCB array, where the TCBs are associated with established network connections. A TCB may correspond to a data structure, that is, a transport control data structure, that comprises the necessary states associated with a network connection, for example. The memory 104 may be implemented utilizing a RAM device, for example.

The T-CAM 106 may comprise suitable logic, circuitry, and/or code that may be adapted to perform parallel searches of its contents. In this regard, the T-CAM 106 may be utilized with the lookup controller 112 in order to obtain the network connection or network session associated with a received network packet. The T-CAM 106 may utilize a single search key generated from network connection parameters or elements extracted from the received network packet. For TCP/IP network connections, the network connection parameters may comprise a local IP address (lip), a local port number (lp), a foreign IP address (fip), and/or a foreign port number (fp), for example. In this regard, the network connection parameters comprising parameters such as (lip, lp, fip, fp) may be referred to as a tuple or 4-tuple.

The TCP/IP processor IC 102 may comprise suitable logic, circuitry, and/or code that may be adapted to receive network packets and process the received network packets in accordance with the states provided by the TCB associated with the appropriate network connection. Moreover, the TCP/IP processor IC 102 may be adapted to process network packets for transmission in accordance with states provided by the TCB associated with the appropriate network connection. In this regard, the TCP/IP processor IC 102 may receive at least a portion of the contents of the appropriate transport control data structure from the memory 104. The control and processing logic 108 may comprise suitable logic, circuitry, and/or code that may be adapted to control the operations of the receiver 114, the lookup controller 112, and/or the TCP/IP engine 110. Moreover, the control and processing logic 108 may be adapted to control and/or manage a portion of the communication between the TCP/IP processor IC 102 and/or the T-CAM 104 and/or the memory 104.

The receiver 114 may comprise suitable logic, circuitry, and/or code that may be adapted to receive a network packet and extract the network connection parameters. In the case of a TCP/IP connection, the receiver 114 may be adapted to extract the tuple (lip, lp, fip, fp), for example. The receiver 114 may be adapted to generate a search key based on the extracted tuple and to transfer the search key to the lookup controller 112. The lookup controller 112 may comprise suitable logic, circuitry, and/or code that may be adapted to control access to information stored in the T-CAM 106. The lookup controller 112 may be adapted to receive the search key from the receiver 114 and to generate an identifier associated with the transport control data structure that corresponds to the received network packet. In this regard, the lookup controller 112 may control the access to the T-CAM 106 to search for the associated identifier.

The TCP/IP engine 110 may comprise suitable logic, circuitry, and/or code that may be adapted to process network packets. The TCP/IP engine 110 may be adapted to receive a transport control data structure identifier from the lookup controller 112 or the T-CAM 106 and may utilize the identifier to obtain the appropriate transport control data structure contents from the memory 104. In this regard, the identifier may be utilized by the TCP/IP engine 110 as a search key for the memory 104.

Figure 2:
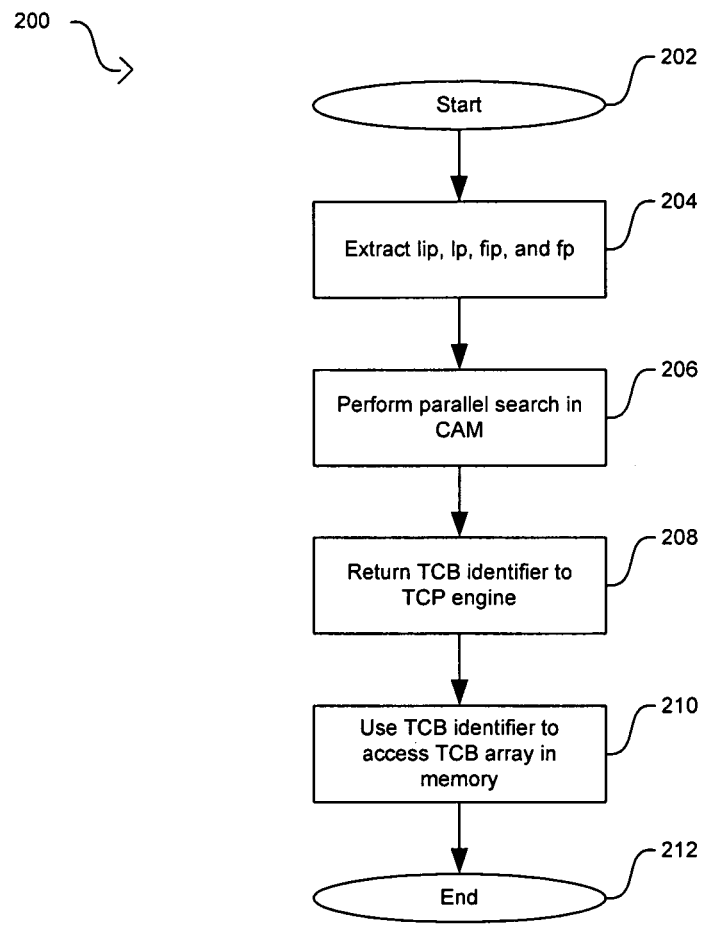
FIG. 2 is a flow diagram that illustrates exemplary steps for searching transport control blocks (TCBs) utilizing a T-CAM, which may be utilized in accordance with an embodiment of the invention.

FIG. 2 is a flow diagram that illustrates exemplary steps for searching transport control blocks (TCBs) utilizing a T-CAM, which may be utilized in accordance with an embodiment of the invention. Referring to FIG. 2, after start step 202, in step 204, the receiver 114 may receive a network packet and extracts the tuple (lip, lp, fip, fp). In step 206, the receiver 114 may transfer a search key based on the extracted tuple to the lookup controller 112 in order to perform a parallel search on the T-CAM 106 of the TCB identifier that corresponds to the received network packet. In step 208, the result of the parallel search, that is, the TCB identifier, may be transferred to the TCP/IP engine 110. In step 210, the TCP/IP engine 110 may utilize the TCB identifier to obtain from the TCB array in the memory 104 the contents that correspond to the network connection associated with the received network packet. After step 210, the process may proceed to end step 212. While the flow diagram 200 described in FIG. 2 corresponds to an operation when a network packet is received, a similar approach may be followed for network packet transmission.

In some instances, network connection information may need to be accessed via a remote direct memory access (RDMA) to local or host memory locations. This may be achieved via one or more tags or symbolic tags (STags) and/or target offsets. An STag may be a symbolic representation of a memory region or a memory window. A target offset may be utilized to identify the exact location in the memory region or memory window denoted by a corresponding STag. Qualifying and translating a symbolic address, that is, an STag and target offset into the true host address may be achieved via two tables, such as a memory protection table (MPT) and a memory translation table (MTT). In order to increase processing speed and efficiency, at least a portion of the MPT and/or the MTT information may be stored on-chip, within an adaptive cache for example.

Figure 3A:
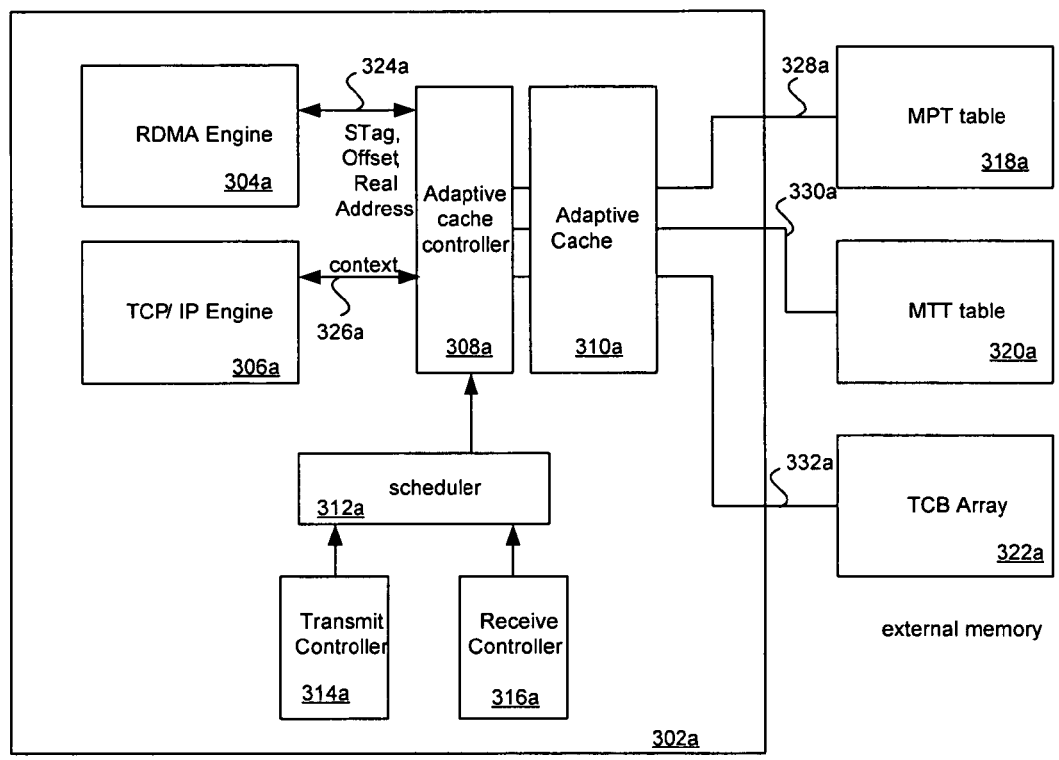
FIG. 3A is a block diagram of exemplary network processor integrated circuit (IC) that utilizes an adaptive on-chip cache, in accordance with an embodiment of the invention.

FIG. 3A is a block diagram of exemplary network processor integrated circuit (IC) that utilizes an adaptive on-chip cache, in accordance with an embodiment of the invention. Referring to FIG. 3A, there is shown a TCP/IP processor integrated circuit (IC) 302*a*, a memory protection table (MPT) 318*a*, a memory translation table (MTT) 320*a*, and a transport control block (TCB) array 322*a*. The exemplary TCP/IP processor IC 302*a* may comprise an RDMA engine 304*a*, a TCP/IP engine 306*a*, a controller 308*a*, a scheduler 312*a*, a transmit controller 314*a*, a receive controller 316*a*, and adaptive cache 310*a*.

The receive controller 316*a* may comprise suitable circuitry, logic, and/or code and may be adapted to receive and pre-process data from one or more network connections. The receive controller 316*a* may process the data based on one of a plurality of protocol types, such as an Ethernet protocol, a transmission control protocol (TCP), an Internet protocol (IP), and/or Internet small computer system interface (iSCSI) protocol.

The transmit controller 314*a* may comprise suitable circuitry, logic, and/or code and may be adapted to transmit data to one or more network connections of a specific protocol type. The scheduler 312*a* may comprise suitable circuitry, logic, and/or code and may be adapted to schedule the processing of data for a received connection by the RDMA engine 304*a* or the TCP/IP engine 306*a*, for example. The scheduler 312*a* may also be utilized to schedule the processing of data by the transmit controller 314*a* for transmission.

The transmit controller 314*a* may comprise at least a portion of the functionality that may be implemented in the control and processing logic 108 in FIG. 1, for example. The transmit controller 314*a* may be adapted to accept a Tx request and then request the scheduler 312*a* to load TCB context from the adaptive cache 310*a* into the TCP engine 306*a* for header preparation via the adaptive cache controller 308*a*. The transmit controller 314*a* may also set up a DMA connection for communicating the data payload from the memory to a buffer within a network interface. The header generated by the TCP engine 306*a* may be combined with the received payload to generate a transmit packet.

The controller 308*a* may comprise suitable circuitry, logic, and/or code and may be utilized to control access to information stored in the adaptive cache 310*a*. The RDMA engine 304*a* may comprise suitable circuitry, logic, and/or code and may be adapted to process one or more RDMA packets received from the receive controller 316*a* via the scheduler 312*a* and the controller 308*a*. The TCP/IP engine 306*a* may comprise suitable circuitry, logic, and/or code and may be utilized to process one or more TCP or IP packets received from the receive controller 316*a* via the scheduler 312*a* and the controller 408*a*. Processed packets may be communicated from the RDMA engine 304*a* or the TCP/IP engine 306*a* to the transmit controller 314*a* for transmission, via the controller 308*a* and the scheduler 312*a*.

In an exemplary embodiment of the invention, table entry information from the MPT 318*a* and the MTT 320*a*, which may be stored in external memory, may be cached within the adaptive cache 310*a* via connections 328*a* and 330*a*, respectively. Furthermore, transmission control block (TCB) information for a TCP connection from the TCB array 322*a* may also be cached within the adaptive cache 310*a*. The MPT 318*a* may comprise search key entries and corresponding MPT entries. The search key entries may comprise a symbolic tag (STag), for example, and the corresponding MPT entries may comprise a pointer to an MTT entry and/or access permission indicators. The access permission indicators may indicate a type of access that may be allowed for a corresponding host memory location identified by a corresponding MTT entry.

The MTT 320*a* may also comprise MTT entries that may be utilized by the TCP/IP processor IC 302*a*. An MTT entry may comprise a true memory address for a host memory location. In this regard, a real host memory location may be obtained from STag input information by using information from the MPT 318*a* and the MTT 320*a*. MPT and MTT table entries cached within the adaptive cache 310*a* may be utilized by the TCP/IP processor IC 302*a* during processing of RDMA connections, for example.

The adaptive cache 310*a* may also store a portion of the TCB array 322*a* via the connection 332*a*. The TCB array data may comprise search key entries and corresponding TCB context entries. The search key entries may comprise TCP tuple information, such as local IP address (lip), local port number (lp), foreign IP address (fip), and foreign port number (fp). The tuple (lip, lp, fip, fp) may be utilized by a TCP connection to locate a corresponding TCB context entry, which may then be utilized during processing of a current TCP packet.

In operation, network protocol packets, such as Ethernet packets, TCP packets, IP packets or RDMA packets may be received by the receive controller 316a. The RDMA packets may be communicated to the RDMA engine 304a. The TCP and IP packets may be communicated to the TCP/IP engine 306a for processing. The RDMA engine 304a may then communicate STag key search entry to the adaptive cache 310a via the connection 324a and the controller 308a. The adaptive cache 310a may perform a search of the MPT and MTT table entries to find a corresponding real host memory address. The located real memory address may be communicated back from the adaptive cache 310a to the RDMA engine 304a via the controller 308a and the connection 324a.

Similarly, the TCP/IP engine 306a may communicate TCP tuple information for a current TCP or IP connection to the adaptive cache 310a via the connection 326a and the controller 308a. The adaptive cache 310a may perform a search of the TCB context entries, based on the received TCP/IP tuple information. The located TCB context information may be communicated back from the adaptive cache 310a to the TCP/IP engine 306a via the controller 308a and the connection 326a.

In an exemplary embodiment of the invention, the adaptive cache 310a may comprise a plurality of cache banks, which may be used for caching MPT, MTT and/or TCB context information. Furthermore, the cache banks may be configured on-the-fly during processing of packet data by the TCP/IP processor IC 302a, based on memory need.

Figure 3B:
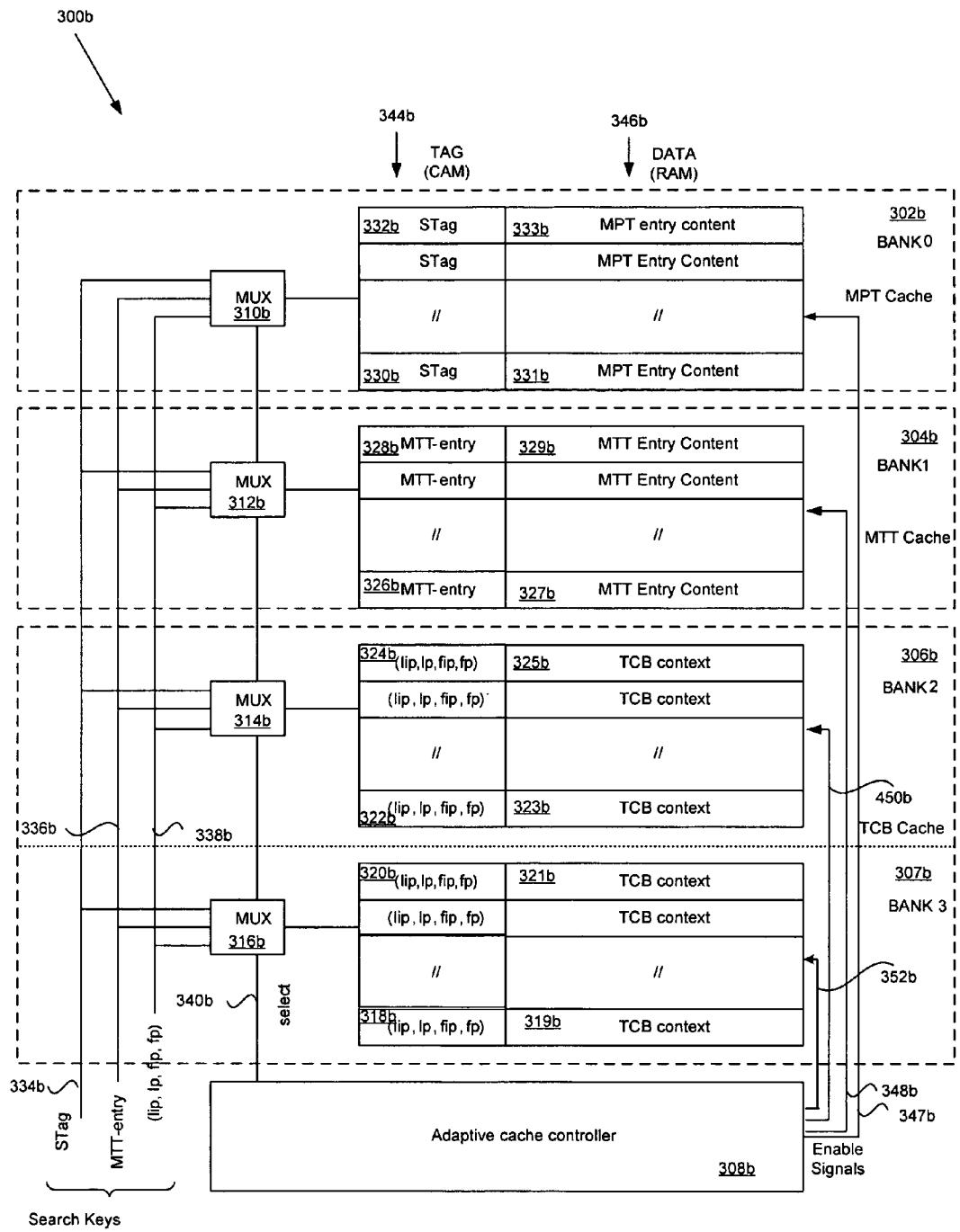
FIG. 3B is a block diagram of an exemplary adaptive on-chip cache in a network processor IC, in accordance with an embodiment of the invention.

FIG. 3B is a block diagram of an exemplary adaptive on-chip cache in a network processor IC, in accordance with an embodiment of the invention. Referring to FIG. 3B, the adaptive cache 300b may comprise a plurality of on-chip cache banks for storing active connection context for any one of a plurality of communication protocols. For example, the adaptive cache 300b may comprise cache banks 302b, 304b, 306b, and 307b.

The cache bank 302b may comprise a multiplexer 310b and a plurality of memory locations 330b, . . . , 332b and 331b, . . . , 333b. The memory locations 330b, . . . , 332b may be located within a content addressable memory (CAM) 344b and the memory locations 331b, . . . , 333b may be located within a read access memory (RAM) 346b. The memory locations 330b, . . . , 332b within the CAM 344b may be utilized to store search keys corresponding to entries within the memory locations 331b, . . . , 333b. The memory locations 331b, . . . , 333b within the RAM 346b may be utilized to store memory protection table (MPT) entries corresponding to the search keys stored in the CAM locations 330b, . . . , 332b. The MPT entries stored in memory locations 331b, . . . , 333b may be utilized for accessing one or more corresponding memory translation table (MTT) entries, which may be stored in another cache bank within the adaptive cache 300b. In one embodiment of the invention, the MPT entries stored in the RAM locations 331b, . . . , 333b may comprise search keys for searching the MTT entries in another cache bank within the adaptive cache 300b. Furthermore, the MPT entries stored in the RAM locations 331b, . . . , 333b may also comprise access permission indicator. The access permission indicators may indicate a type of access to a corresponding host memory location for a received RDMA connection.

Cache bank 304b may comprise a multiplexer 312b and a plurality of memory locations 326b, . . . , 328b and 327b, . . . , 329b. The memory locations 326b, . . . , 328b may be located within the CAM 344b and the memory locations 327b, . . . , 329b may be located within the RAM 346b. The cache bank 304b may be utilized to store one or more memory translation table (MTT) entries for accessing one or more corresponding host memory locations by their real memory addresses.

The ache bank 306b may be utilized during processing of a TCP connection and may comprise a multiplexer 314b and a plurality of memory locations 322b, . . . , 324b and 323b, . . . , 325b. The memory locations 322b, . . . , 324b may be located within the CAM 344b and the memory locations 323b, . . . , 325b may be located within the RAM 346b. The cache bank 306b may be utilized to store one or more transmission control block (TCB) context entries, which may be searched and located by a corresponding TCP tuple, such as local IP address (lip), local port number (lp), foreign IP address (fip), and foreign port number (fp). Similarly, the cache bank 307b may also be utilized during processing of TCP connections and may comprise a multiplexer 316b and a plurality of memory locations 318b, . . . , 320b and 319b, . . . , 321b. The memory locations 318b, . . . , 320b may be located within the CAM 344b and the memory locations 319b, . . . , 321b may be located within the RAM 346b. The cache bank 307b may be utilized to store one or more transmission control block (TCB) context entries, which may be searched and located by a corresponding TCP tuple (lip, lp, fip, fp).

The multiplexers 310b, . . . , 316b may comprise suitable circuitry, logic, and/or code and may be utilized to receive a plurality of search keys, such as search keys 334b, . . . , 338b and select one search key based on a control signal 340b received from the adaptive cache controller 308b.

The adaptive cache controller 308b may comprise suitable circuitry, logic, and/or code and may be adapted to control selection of search keys 334b, . . . , 338b for the multiplexers 310b, . . . , 316b. The adaptive cache controller 308b may also generate enable signals 347b, . . . , 352b for selecting a corresponding cache bank within the adaptive cache 300b.

In operation, cache banks 302b, . . . , 307b may be initially configured for caching TCB context information. During processing of network connections, cache resources within the adaptive cache 300b may be re-allocated according to memory needs. In this regard, the cache bank 302b may be utilized to store MPT entries information, the cache bank 304b may be utilized to store MTT entries information, and the remaining cache banks 306b and 307b may be utilized for storage of the TCB context information. Even though the adaptive cache 300b is illustrated as comprising four cache banks allocated as described above, the present invention may not be so limited. A different number of cache banks may be utilized within the adaptive cache 300b, and the cache bank usage may be dynamically adjusted during network connection processing, based on, for example, dynamic memory requirements.

One or more search keys, such as search keys 334b, . . . , 338b may be received by the adaptive cache 300b and may be communicated to the multiplexers 310b, . . . , 316b. The adaptive cache controller 308b may generate and communicate a select signal 340b to one or more of the multiplexers 310b, . . . , 316b, based on the type of received search key. The adaptive cache controller 308b may also generate one or more cache bank enable signals 347b, . . . , 352b also based on the type of received search key. For example, if STag 334b is received by the adaptive cache 300b, the adaptive cache controller 308b may generate a select signal 340b and may select the multiplexer 310b. The adaptive cache controller 308b may also generate a control signal 347b for activating the cache bank 302b. The adaptive cache controller 308b may search the CAM portion of bank 302b, based on the received STag 334b. When a match occurs, an MTT entry may be acquired from the MPT entry corresponding to the STag 334b. The MTT entry may then be communicated as a search key entry 336b to the adaptive cache 300b.

In response to the MTT-entry 336b, the adaptive cache controller 308b may generate a select signal 340b and may select the multiplexer 312b. The adaptive cache controller 308b may also generate a control signal 348b for activating the cache bank 304b. The adaptive cache controller 308b may search the CAM portion of bank 304b, based on the received MTT entry 336b. When a match occurs, a real host memory address may be acquired from the MTT entry content corresponding to the search key 336b. The located real host memory address may then be communicated to an RDMA engine, for example, for further processing.

In response to a received 4-tuple (lip, lp, fip, fp) 338b, the adaptive cache controller 308b may generate a select signal 340b and may select the multiplexer 314b and/or the multiplexer 316b. The adaptive cache controller 308b may also generate a control signal 350b and/or 352b for activating the cache bank 306b and/or the cache bank 307b. The adaptive cache controller 308b may search the CAM portion of the cache bank 306b and/or the cache bank 307b, based on the received TCP 4-tuple (lip, lp, fip, fp) 338b. When a match occurs within a RAM 346b entry, the TCB context information may be acquired from the TCB context entry corresponding to the TCP 4-tuple (lip, lp, fip, fp) 338b.

In an exemplary embodiment of the invention, the CAM portion 344b of the adaptive cache 300b may be adapted for parallel searches. Furthermore, cache banks within the adaptive cache 300b may be adapted for simultaneous searches, based on a received search key. For example, the adaptive cache controller 308b may initiate a search for a TCB context to the cache banks 306b and 307b, a search for an MTT entry in the cache bank 304b, and a search for an MPT entry in the cache bank 302b simultaneously.

Figure 4A:
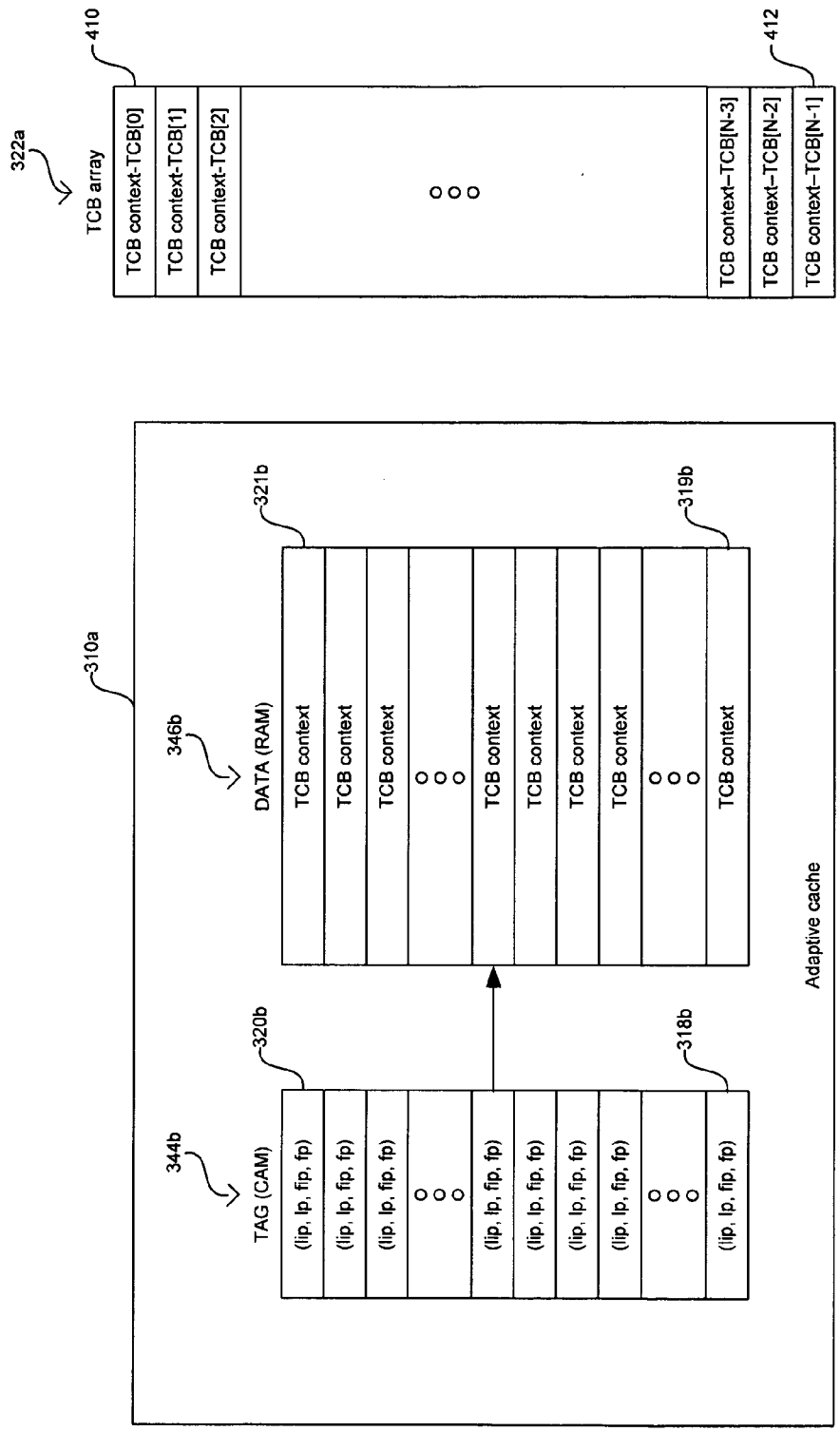
FIG. 4A is a block diagram of an exemplary tag and data portions of the TCB cache and the external TCB array, in accordance with an embodiment of the invention.

FIG. 4A is a block diagram of an exemplary tag and data portions of the TCB cache and the external TCB array, in accordance with an embodiment of the invention. Referring to FIG. 4A, there is shown a portion of the adaptive cache 310a and a portion of the TCB array 322a as described in FIGS. 3A and 3B. In this regard, only the portions of the CAM 344b and the RAM 346b that correspond to the cache bank 307b for TCB caching are shown for illustration. When additional cache banks are utilized for TCB caching, the portion of the adaptive cache 310a that corresponds to TCB caching may comprise additional memory locations than those shown in FIG. 4A.

On-chip caching of the TCB context information stored externally to the TCP/IP processor IC 302a in the TCB array 322a may comprise storing the TCB context that correspond to the most active and/or most recent network connections or sessions in the adaptive cache 310a. The TCB context may be stored in the DATA portion of the adaptive cache 310a, that is, the RAM 346b, while the tuple that corresponds to the TCB context may be stored in the TAG portion of the adaptive cache 310a, that is, the CAM 344b. In some instances, the TAG portion may be referred to as a lookup table (LUT) while the DATA portion may also be referred to as the context memory. The number of entries for TCB cache in the adaptive cache 310a may be smaller than the number of TCB context entries in the TCB array 322a. When additional TCB context entries are to be stored in the adaptive cache 310a, additional cache banks may be utilized.

The TCB cache portion of the CAM 344b and the RAM 346b may comprise a top memory location and a bottom memory location. For example, in the illustrative case where only the cache bank 307b is being utilized for TCB caching, the top TAG memory in the RAM 344b may be memory location 320b and the bottom TAG memory in the RAM 344b may be memory location 318b. Similarly, the top DATA memory in the RAM 346b may be memory location 321b and the bottom DATA memory in the RAM 346b may be memory location 319b. The top and bottom TAG and DATA memory locations may vary in accordance with the number and selection of cache banks utilized for TCB caching.

There may be N pre-allocated TCBs in the TCB array 322a. The TCBs may be logically numbered from 0 to N−1, for example, where TCB[0] may correspond to the top memory location in the TCB array 322a, that is, memory location 410, while TCB[N−1] may correspond to the bottom memory location in the TCB array 322a, that is, memory location 412. In this regard, each memory location in the TCB array 322a may correspond to a numeric index that may be denoted as Idx, where Idx∈{0 . . . N−1}, where TCB[Idx] indicates the memory location of the TCB associated with numeric index Idx. The numeric index, Idx, may also be referred to as a TCB identifier. Moreover, in one embodiment of the invention, N may be less than 65,536 (2^16), for example, and Idx may be implemented as a 16-bit integer that may be utilized for encoding the array range {0 . . . N−1}.

Figure 4B:
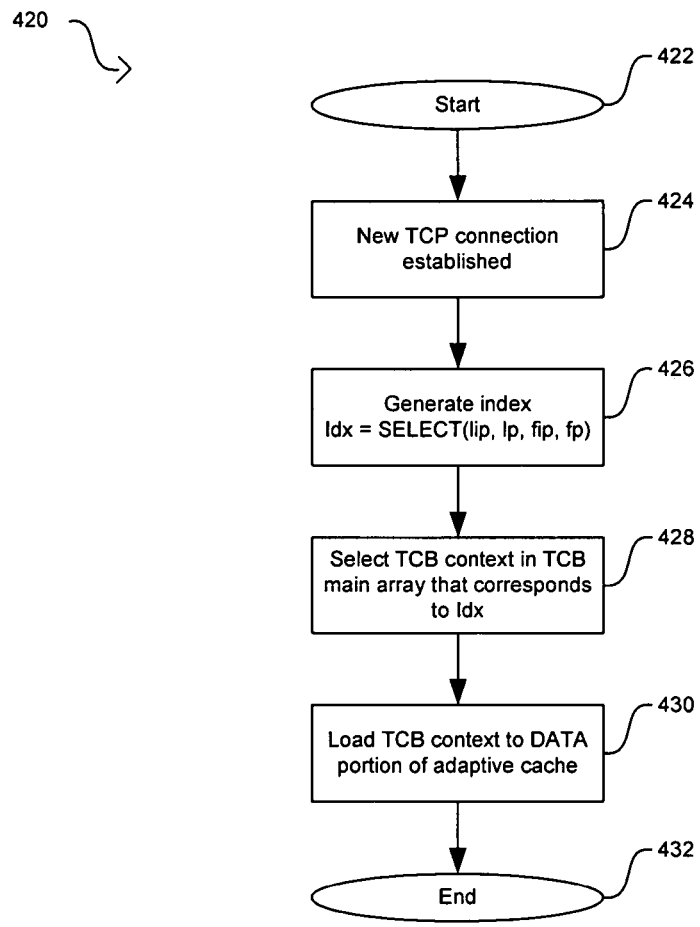
FIG. 4B is a flow diagram illustrating exemplary steps in the allocation of a TCB to the on-chip cache, in accordance with an embodiment of the invention.

FIG. 4B is a flow diagram illustrating exemplary steps in the allocation of a TCB to the on-chip cache, in accordance with an embodiment of the invention. Referring to FIG. 4B, after start step 422, in step 424, a new TCP connection or session may be established associated with the TCP/IP processing IC 402a. In step 426, a numeric index, Idx, may be generated for the new TCP connection based on the function:

Idx=SELECT (lip, lp, fip, fp), where Idx∈{0 . . . N−1}. The SELECT function may receive the tuple (lip, lp, fip, fp) as input and may generate a 16-bit numeric index, for example. In this regard, tuple (lip, lp, fip, fp) may correspond to a search key for the TCB array 322a.

In step 428, the TCB context in the TCB array 322a memory location associated with the Idx value generated in step 426 may be selected. In step 430, the TCB context may be loaded to the DATA portion, that is, the RAM 346b, of the TCB cache in the adaptive cache 310a in the TCP/IP processor IC 402a. In this regard, the associated tuple (lip, lp, fip, fp) may be stored in the TAG portion, that is, the CAM 344b, of the TCB cache in the adaptive cache 310a. As a result, active sessions may be cached in the adaptive cache 310a to speed up access to the TCB context for packet processing. After step 430, the process may proceed to end step 432.

Figure 4C:
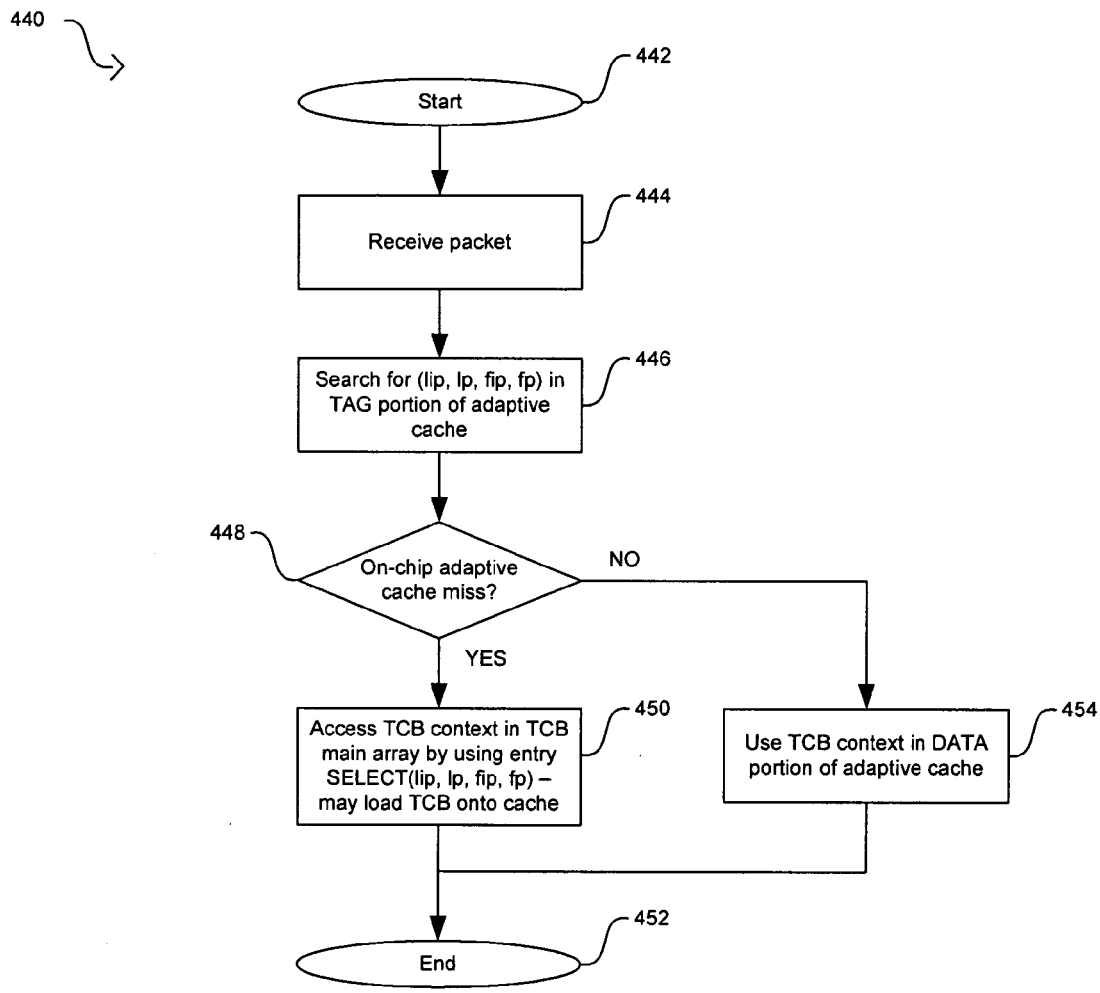
FIG. 4C is a flow diagram illustrating exemplary steps in searching for the TCB context associated with a network connection in the on-chip cache and external TCB array, in accordance with an embodiment of the invention.

FIG. 4C is a flow diagram illustrating exemplary steps in searching for the TCB context associated with a network connection in the on-chip cache and external TCB array, in accordance with an embodiment of the invention. Referring to FIG. 4C, after start step 442, in step 444, a network packet may be received by the TCP/IP processor IC 302a, for example. In step 446, a search may be performed in the TAG portion, that is, the CAM 344b, of the TCB cache in the adaptive cache 310a. In this regard, the search may be based on the tuple (lip, lp, fip, fp) extracted from the received network packet. In step 448, the adaptive cache 310a may determine whether the TCB context associated with the tuple (lip, lp, fip, fp) was stored in the TCB cache portion. When a cache miss occurs, the exemplary steps may proceed to step 450. A cache miss may occur when the TCP context associated with the tuple (lip, lp, fip, fp) not stored in the adaptive cache 310a. In step 450, the TCB context may be searched in the TCB array 322a based on the SELECT function. When the TCB context is found in the TCB array 322a, it may be transferred to, for example, the TCP/IP engine 306a and may be loaded into the adaptive cache 310a. Returning to step 448, when the TCP context associated with the tuple (lip, lp, fip, fp) is found in the adaptive cache 310a, the TCP/IP engine 306a may receive the TCB context stored in the adaptive cache 310 via the adaptive cache controller 308a.

Figure 5A:
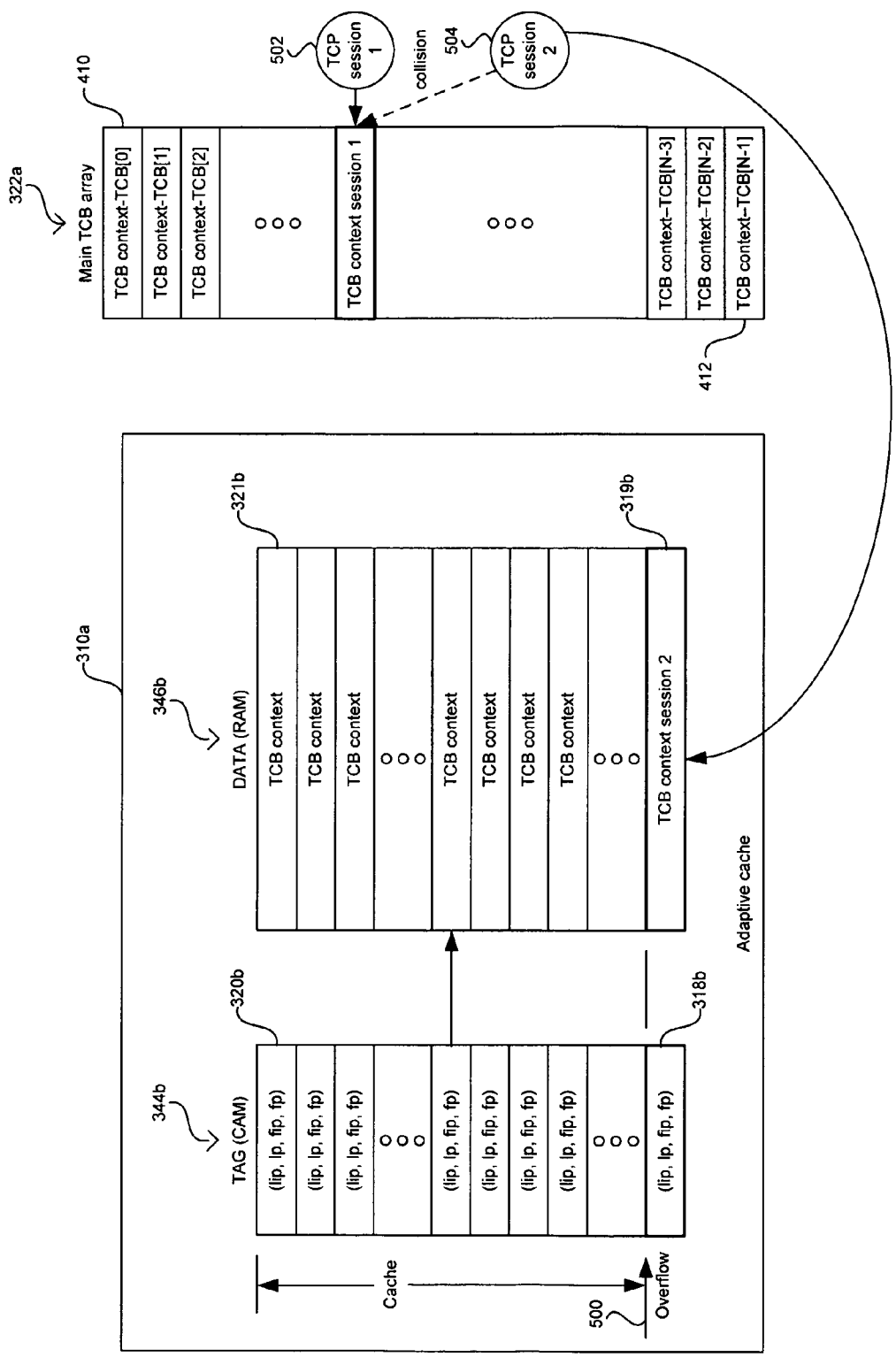
FIG. 5A is a block diagram that illustrates an exemplary networking session collision, in accordance with an embodiment of the invention.

FIG. 5A is a block diagram that illustrates an exemplary networking session collision, in accordance with an embodiment of the invention. Referring to FIG. 5A, there is shown a portion of the adaptive cache 310a and a portion of the TCB array 322a as described in FIG. 4A. In this instance, a previous TCP session 502, for example a session labeled session 1, has been allocated a TCB context corresponding to an indexed location in the TCB array 322a. In this regard, the TCB context information from the previous TCP session 502 may have been cached into the TCB cache portion of the adaptive cache 310a. When a subsequent TCP session 504, for example a session labeled session 2, is established, the function SELECT may be applied to the tuple (lip, lp, fip, fp) associated with the subsequent TCP session 504 to generate an numeric index for a TCB context in the TCB array 322a. When the numeric index for session 1 and session 2 are the same, a collision has occurred.

When a collision occurs between a previous and a subsequent TCP session, the contents in the TAG portion, that is, the CAM 344b, and the DATA portion, that is, the RAM 346b, of the entry pointed by an overflow pointer 500 of the TCB cache in the adaptive cache 310a may be written back to the corresponding entry in main TCB array 322a, and the released memory location for the TAG portion, memory location 318b, and for the DATA portion, memory location 319b, may be utilized as an overflow table. In this regard, the tuple (lip, lp, fip, fp) and the TCB context associated with the subsequent TCP session 504 may be stored in memory locations 318b and 319b respectively. As a result of the presence of an overflow table, the portion of memory allocated for TCB context storage in the adaptive cache 310 may be reduced by the number of overflow sessions that may be loaded. The overflow pointer 500 may be utilized to determine which portion of the cache bank or cache banks in the adaptive cache 310a associated with TCB storage comprises TCB cache storage and which portion comprises TCB overflow storage. In this regard, the overflow pointer 500 may indicate an entry point for a next overflow entry. While the exemplary implementation described in FIG. 5A illustrates an instance where the overflow table is created at the bottom of the TCB cache portion of the adaptive cache 310a, the implementation of the overflow table need not be so limited. Accordingly, other implementations may have the overflow table at the top or other location of the TCB cache portion of the adaptive cache 310a, for example.

Figure 5B:
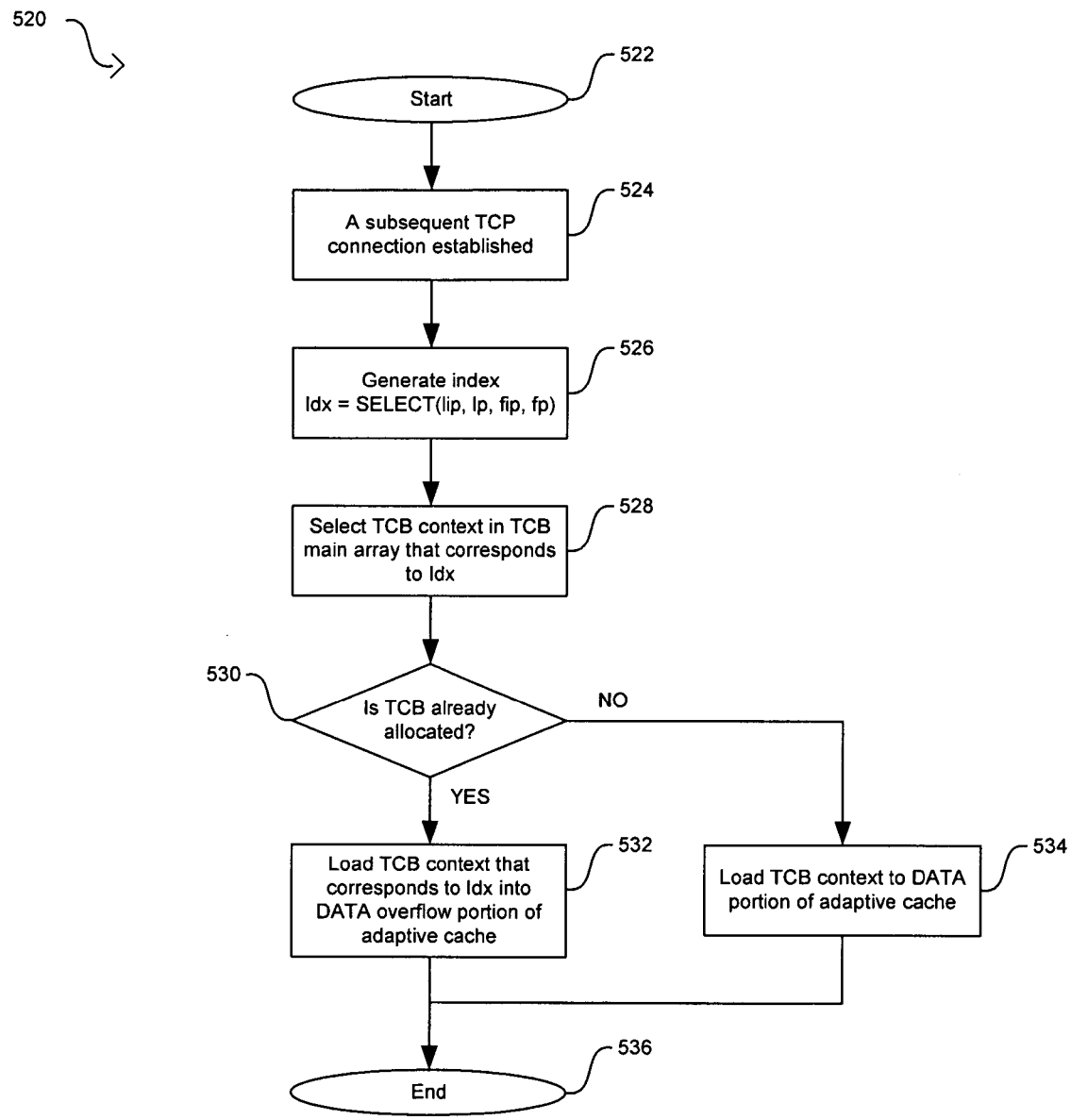
FIG. 5B is a flow diagram illustrating exemplary steps for fetching TCB context associated with the network session collision in an overflow table in the on-chip cache, in accordance with an embodiment of the invention.

FIG. 5B is a flow diagram illustrating exemplary steps for storing TCB context associated with the network session collision in an overflow table in the on-chip cache, in accordance with an embodiment of the invention. Referring to FIG. 5B, after start step 522, in step 524, a subsequent TCP connection may be established that is associated with the TCP/IP processing IC 302a. The subsequent TCP connection may correspond to, for example, the subsequent TCP session 504, labeled session 2, in FIG. 5A. In step 526, a TCB identifier or numeric index, Idx, may be generated for the subsequent TCP connection based on the function:

Idx=SELECT (lip, lp, fip, fp), where Idx$\in\{0 \ldots N-1\}$. The SELECT function may be adapted to receive the tuple (lip, lp, fip, fp) as input and to generate a 16-bit numeric index, for example.

In step 528, the TCB context in the memory location in the TCB array 322a associated with the Idx value generated in step 426 may be selected. In step 530, the TCP/IP processor IC 302a may determine whether a collision has occurred by comparing whether the same numeric index have resulted for the subsequent TCP connection as for a previous TCP connection. When a collision has occurred and the TCB context is already allocated to a previous TCP connection, the process may proceed to step 532. In step 532, the TCB context associated with the subsequent TCP connection may be loaded into an overflow memory or overflow table at the bottom of the RAM 346b in the TCB cache portion of the adaptive cache 310a. Similarly, the tuple that corresponds to the subsequent TCP connection may be stored at the bottom of the CAM 344b in the TCB cache portion of the adaptive cache 310a. In this regard, the value of the overflow pointer 500 may be updated to indicate a new entry in the overflow table. After step 532, the process may proceed to end step 536.

Returning to step 530, when a collision between a previous TCP connection and a subsequent TCP connection has not occurred in the TCB array 322a, the process may proceed to step 534. In step 534, the TCB context that corresponds to the subsequent TCP connection may be loaded to the TCB cache portion of the adaptive cache 310a. After step 534, the process may proceed to end step 536.

Figure 5C:
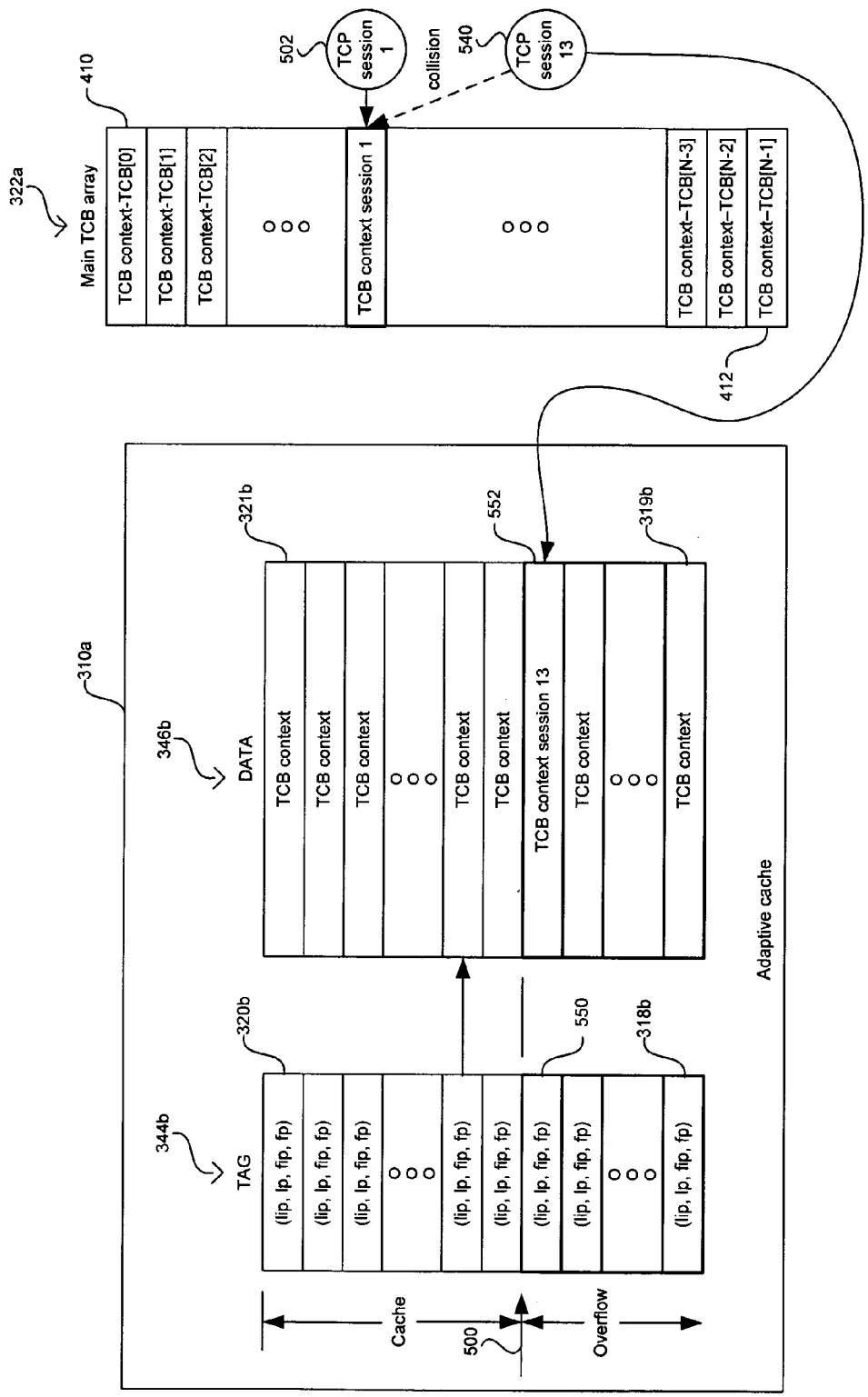
FIG. 5C is a block diagram that illustrates exemplary additional networking session collisions, in accordance with an embodiment of the invention.

FIG. 5C is a block diagram that illustrates exemplary additional networking session collisions, in accordance with an embodiment of the invention. Referring to FIG. 5C, there is shown a portion of the adaptive cache 310a and a portion of the TCB array 322a as described in FIG. 4A. In this instance, a previous TCP session 502, for example a session labeled session 1, has been allocated a TCB context corresponding to an indexed location in the TCB array 322a. The TCB context information from the previous TCP session 502 may have been cached into the TCB cache portion of the adaptive cache 310a. When an additional TCP session 540, for example a session labeled session 13, is established, the function SELECT may be applied to the tuple (lip, Ip, fip, fp) associated with the additional TCP session 540 to generate a numeric index for a TCB context in the TCB array 322a. When the numeric index for session 1 and the numeric index for session 13 are the same, a current collision has occurred. In this instance, at least one collision may have occurred prior to the current collision and the overflow table in the TCB cache portion of the adaptive cache 310a has already been created and the overflow pointer 500 indicates the location of the TCB context associated with the next entry point.

As a result of the current collision, the contents in the memory locations indicated by the overflow pointer 500 in the adaptive cache 310a may be written back to their corresponding entry in the main TCB array 322a, for example. Moreover, the released memory location for the TAG portion, memory location 550 in FIG. 5C, and for the DATA portion, memory location 552, of the TCB cache in the adaptive cache 310a may be utilized to store the tuple (lip, lp, fip, fp) and the TCB context associated with the additional TCP session 540. The overflow pointer 500 that indicates which portion of the cache bank or cache banks in the adaptive cache 310a associated with TCB storage comprises TCB cache storage and which portion comprises TCB overflow storage may be updated to reflect the additional collision.

As a result of the increase of TCB context entries in the overflow table, the portion of memory allocated for TCB cache in the adaptive cache 310a may be reduced by the number of additional overflow sessions. While the exemplary implementation described in FIG. 5C illustrates an instance where the overflow table is expanded at the bottom of the TCB cache portion of the adaptive cache 310*a*, the implementation of the overflow table need not be so limited. Accordingly, in other implementations, the overflow table may be expanded from the top of the TCB cache portion of the adaptive cache 310*a*, for example.

Figure 5D:
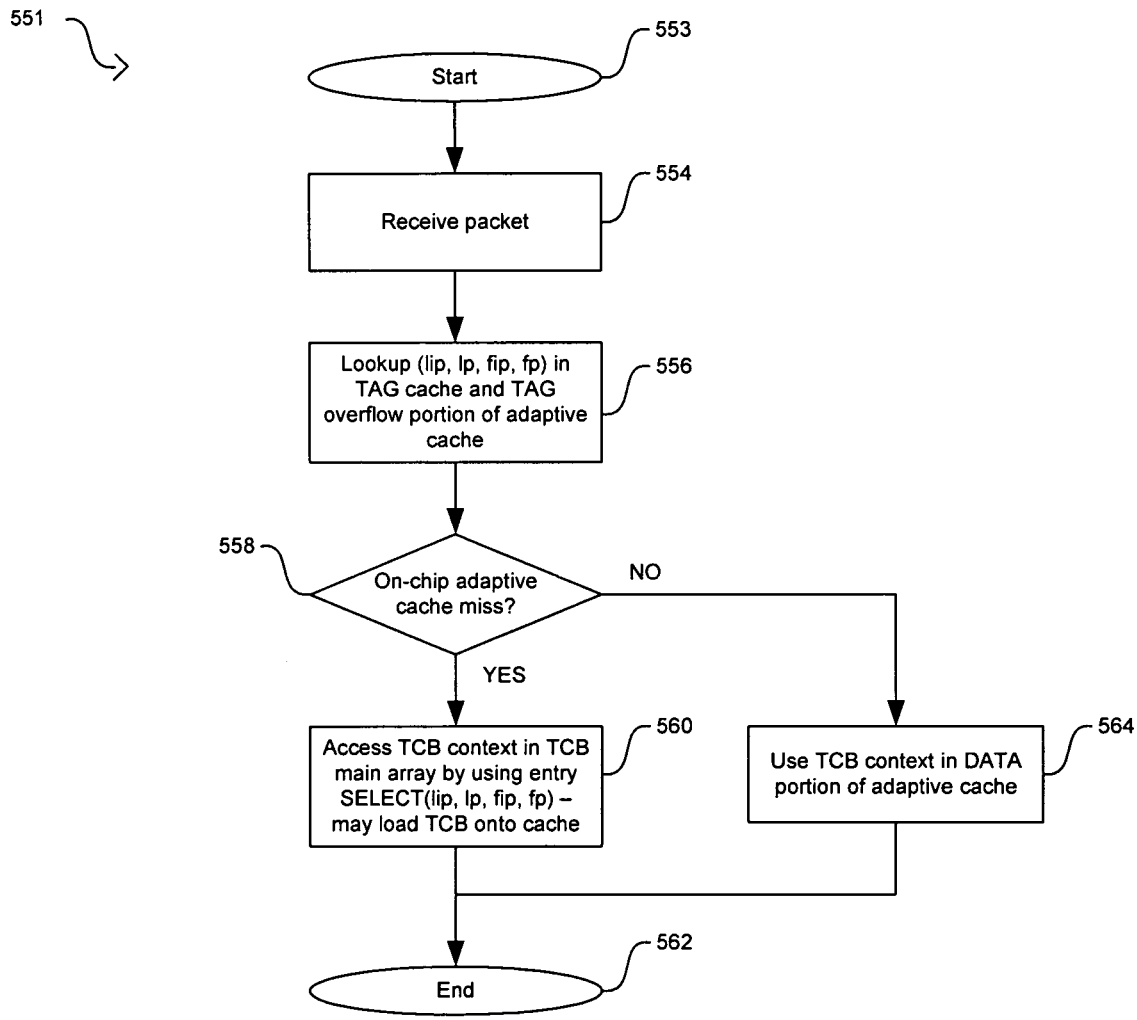
FIG. 5D is a flow diagram illustrating exemplary steps for storing TCB context associated with additional network session collisions in the overflow table in the on-chip cache, in accordance with an embodiment of the invention.

FIG. 5D is a flow diagram illustrating exemplary steps for fetching TCB context associated with additional network session collisions in the overflow table in the on-chip cache, in accordance with an embodiment of the invention. Referring to FIG. 5D, there is shown a flow diagram 551. After start step 553, in step 554, the TCP/IP processor IC 302*a* may receive a network packet, for example. In step 556, a search may be performed in the TAG portion, that is, the CAM 344*b*, of the TCB cache in the adaptive cache 310*a*. In this regard, the search may be based on the tuple (lip, lp, fip, fp) extracted from the received network packet and may be performed both on the cache portion of the CAM 344*b* and the overflow portion of the CAM 344*b*. In step 558, the adaptive cache 310*a* may determine whether a cache miss associated with the tuple (lip, lp, fip, fp) has occurred. In this regard, the search may be performed in both the cache and overflow table portions of the CAM 344*b* in the adaptive cache 310*a*.

When a cache miss occurs, that is, the TCP context associated with the tuple (lip, lp, fip, fp) was not stored in the adaptive cache 310*a*, the process may proceed to step 560. In step 560, the TCB context may be searched in the TCB array 322*a* based on the SELECT function and the tuple (lip, lp, fip, fp) and may be loaded to the adaptive cache 310*a*, for example. When the TCB context is found in the TCB array 322*a*, it may be transferred to, for example, the TCP/IP engine 306*a*. Returning to step 558, when the TCP context associated with the tuple (lip, lp, fip, fp) is found in the adaptive cache 310*a*, that is, a cache miss did not occur, the TCP/IP engine 306*a* may receive the TCB context stored in the adaptive cache 310*a* via the adaptive cache controller 308*a*.

The approach described herein may provide an effective on-chip cache solution that enables fast packet processing for session or network connections without the costs associated with utilizing ever more powerful processor architectures. Moreover, this approach may also address session collisions by utilizing a portion of the on-chip cache for overflow storage.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing communication information, the method comprising:
    performing by one or more processors, one or more circuits, or any combination thereof integrated within a network processor chip:
    partitioning an on-chip cache of said network processor chip into a plurality of segments, each of said segments being associated with one of a plurality of pre-defined network protocols, wherein a capacity of at least one of said segments is adjusted based upon a memory requirement for said on-chip cache;
    allocating an entry in a designated one of said segments for an active network connection, said designated segment being assigned in response to a protocol of said active network connection;
    selecting connection data associated with said active network connection from a memory external to said network processor chip; and
    storing at least a portion of connection data associated with a new network connection in a data cache portion of an overflow entry in said designated segment in response to an identifier associated with said new network connection being equal to an identifier associated with said active network connection.

2. The method according to claim 1, wherein said active network connection comprises a transmission control protocol/Internet protocol (TCP/IP) connection.

3. The method according to claim 1, wherein said active network connection comprises a remote direct memory access (RDMA) connection.

4. The method according to claim 2, wherein said connection data associated with said active network connection includes a network connection context selected from a transport control array of said memory based on a search key.

5. The method according to claim 4, wherein said search key comprises a local Internet Protocol (IP) address (lip), a local port number (Ip), a foreign IP address (fip), or a foreign port number (fp).

6. The method according to claim 4, further comprising:
storing at least a portion of said selected connection data in a data cache portion of said entry allocated in said designated segment; and
storing said search key in a tag cache portion of said entry.

7. The method according to claim 1, comprising:
upon establishment of said new network connection, determining if said identifier associated with said new network connection is equal to said identifier associated with said active network connection, said active network connection being previously established;
wherein said at least said portion of said connection data associated with said new network connection is stored in said data cache portion of said overflow entry in said designated segment in instances where said identifiers are equal; and
wherein said at least said portion of said connection data associated with said new network connection is stored in a data cache portion of a second entry in said designated segment in instances where said identifiers are not equal.

8. The method according to claim 7, wherein said identifier associated with said new network connection and said identifier associated with said active network connection are each generated based on a corresponding search key.

9. The method according to claim 8, comprising, in instances that said identifiers are equal, storing said corresponding search key associated with said new network connection in a tag cache portion of said overflow entry.

10. A non-transitory computer-readable medium having stored thereon a computer program, the computer program being executable by a computer for causing the computer to:
partition an on-chip cache of a network processor chip into a plurality of segments, each of said segments being associated with one of a plurality of pre-defined network protocols, wherein a capacity of at least one of said segments is modified based upon a usage of said on-chip cache;
allocate an entry in a designated one of said segments for an active network connection, said designated segment being determined in response to a protocol of said active network connection;
select connection data associated with said active network connection from a memory external to said network processor chip; and
store at least a portion of connection data associated with a new network connection in a data cache portion of an overflow entry in said designated segment in response to an identifier associated with said new network connection being equal to an identifier associated with said active network connection.

11. The non-transitory computer-readable medium according to claim 10, wherein said active network connection comprises a transmission control protocol/Internet protocol (TCP/IP) connection.

12. The non-transitory computer-readable medium according to claim 10, wherein said active network connection comprises a remote direct memory access (RDMA) connection.

13. The non-transitory computer-readable medium according to claim 11, wherein said connection data associated with said active network connection includes a network connection context selected from said memory based on a search key.

14. The non-transitory computer-readable medium according to claim 13, wherein said search key comprises a local Internet Protocol (IP) address (lip), a local port number (Ip), a foreign IP address (fip), or a foreign port number (fp).

15. The non-transitory computer-readable medium according to claim 13, wherein said computer program further causes the computer to:
store at least a portion of said selected connection data in a data cache portion of said entry allocated in said designated segment; and
store said search key in a tag cache portion of said entry.

16. The non-transitory computer-readable medium according to claim 10, wherein said computer program further causes the computer to:
upon establishment of said new network connection, determine if said identifier associated with said new network connection is equal said identifier associated with said active network connection, said active network connection being previously established;
wherein said at least said portion of said connection data associated with said new network connection is stored in said data cache portion of said overflow entry in said designated segment in instances where said identifiers are equal; and
wherein said at least said portion of said connection data associated with said new network connection is stored in a data cache portion of a second entry in said designated segment in instances where said identifiers are not equal.

17. The non-transitory computer-readable medium according to claim 16, wherein said identifier associated with said new network connection and said identifier associated with said active network connection are each generated based on a corresponding search key.

18. The non-transitory computer-readable medium according to claim 17, wherein said computer program further causes the computer to, in instances that said identifiers are equal, store a search key associated with said new network connection in a tag cache portion of said overflow entry.

19. A system for processing communication information, the system comprising:
a network processor chip that comprises an on-chip cache and a cache controller wherein:
one or more segments of said on-chip cache are allocated such that a type of entry associated with each of said one or more segments of said on-chip cache is based on which of a plurality of pre-defined protocols are associated with one or more active network connections;
said network processor chip is operable to select a network connection context associated with a particular one of said one or more active network connections from a transport control array in a memory external to said network processor chip;
said cache controller is operable to store at least a portion of a network connection context associated with a new network connection in a data cache portion of an overflow entry in a designated one of said one or more segments of said on-chip cache in response to an identifier associated with said new network connection being equal to an identifier associated with said particular active network connection, said designated segment being determined based on a protocol associated with said particular active network connection; and
said cache controller is further operable to adjust capacities of said one or more segments in response to usage of said on-chip cache.

20. The system according to claim 19, wherein said one or more active network connections comprise one or more transmission control protocol/Internet protocol (TCP/IP) connections.

21. The system according to claim 19, wherein said one or more active network connections comprise one or more remote direct memory access (RDMA) connections.

22. The system according to claim 19, wherein said network processor chip is operable to select said network connection context associated with said particular active network connection from said transport control array based on a search key.

23. The system according to claim 22, wherein said search key comprises a local Internet Protocol (IP) address (lip), a local port number (Ip), a foreign IP address (fip), or a foreign port number (fp).

24. The system according to claim 22, wherein said cache controller is further operable to:
store at least a portion of said selected network connection context in a data cache portion of an entry allocated in said designated segment; and
store said search key in a tag cache portion of said entry.

25. The system according to claim 19, wherein:
upon establishment of said new network connection, said network processor chip is operable to determine if said identifier associated with said new network connection is equal to said identifier associated with a previously established one of said one or more active network connections;
wherein said at least said portion of said network connection context associated with said new network connection is stored in said data cache portion of said overflow entry allocated in said designated segment of said on-chip cache in instances where said identifiers are equal; and
wherein said at least said portion of said network connection context associated with said new network connection is stored in a data cache portion of a second entry in said designated segment in instances where said identifiers are not equal.

26. The system according to claim 25, wherein said identifier associated with said new network connection and said identifier associated with said previously established active network connection are each generated based on a corresponding search key.

27. The system according to claim 26, wherein said cache controller is operable to, in instances that said identifiers are equal, store a search key associated with said new network connection in a tag cache portion of said overflow entry.

* * * * *

UNITED STATES PATENT AND TRADEMARK OFFICE
CERTIFICATE OF CORRECTION

| | | |
|---|---|---|
| PATENT NO. | : 8,619,790 B2 | Page 1 of 1 |
| APPLICATION NO. | : 11/228398 | |
| DATED | : December 31, 2013 | |
| INVENTOR(S) | : Fong Pong | |

It is certified that error appears in the above-identified patent and that said Letters Patent is hereby corrected as shown below:

In the Claims:

Column 16, line 15, after the word "equal" insert the word --to--.

Signed and Sealed this
Twenty-second Day of April, 2014

Michelle K. Lee
*Deputy Director of the United States Patent and Trademark Office*